United States Patent [19]

Knodler et al.

[11] 4,419,418

[45] Dec. 6, 1983

[54] INDIVIDUAL RECHARGEABLE ELECTRIC CELL

[75] Inventors: Reinhard Knodler; Friedrich Harbach; Ludwig Weiler, all of Heidelberg, Fed. Rep. of Germany

[73] Assignee: Brown, Boveri & Cie AG, Mannheim, Fed. Rep. of Germany

[21] Appl. No.: 362,550

[22] Filed: Mar. 26, 1982

[30] Foreign Application Priority Data

Apr. 9, 1981 [DE] Fed. Rep. of Germany ....... 3114348

[51] Int. Cl.$^3$ ................. H01M 4/36; H01M 2/38; H01M 2/02; H01M 2/08
[52] U.S. Cl. .................... 429/104; 429/67; 429/181; 429/185; 429/169
[58] Field of Search ............ 429/104, 167, 168, 169, 429/171, 172, 174, 181, 185, 67, 68

[56] References Cited

U.S. PATENT DOCUMENTS

| | | | |
|---|---|---|---|
| 3,514,332 | 5/1970 | Minck | 429/104 |
| 4,061,840 | 12/1977 | Jones et al. | 429/185 |
| 4,169,919 | 10/1979 | Topouzian | 429/185 |
| 4,192,911 | 3/1980 | Topouzian | 429/174 |
| 4,197,363 | 4/1980 | Topouzian et al. | 429/185 |
| 4,216,276 | 8/1980 | Weddigen et al. | 429/104 |
| 4,239,838 | 12/1980 | Miller et al. | 429/104 |

*Primary Examiner*—Brian E. Hearn
*Assistant Examiner*—Stephen J. Kalafut

[57] ABSTRACT

Individual rechargeable electric cell with an outer metal housing, an electrolyte tube open at the top arranged coaxially in the housing, liquid sodium in the tube, a current collector extending down through the open end of the tube into the sodium, an alpha-$Al_2O_3$ ring at the open end of the tube, a first flexible flange which connects the current collector to the ring attached to the tube via an aluminum ring, a second flexible flange connected to the housing and to the alpha-$Al_2O_3$ ring via another ring, and sulfur in the space between the housing and tubular electrolyte.

1 Claim, 1 Drawing Figure

INDIVIDUAL RECHARGEABLE ELECTRIC CELL

BACKGROUND OF THE INVENTION

1. Field of the Invention

The invention relates to an individual rechargeable electric cell with liquid sodium as the negative and liquid sulfur, absorbed in graphite, as the positive electrochemical material as well as with a sodium ion-conducting solid electrolyte which is disposed in the metallic housing of the individual cell as a container, which is open on one side and contains the sulfur and the sodium, respectively, and includes a current collector.

2. Description of the Prior Art

It is known that an individual rechargeable electric cell may consist substantially of melted sodium as one reaction substance and melted sulfur as the other, with the two reaction partners separated by a solid-electrolyte tube. At the operating temperature of the Na/S cell of 300° to 350° C., this tube has a high sodium-ion conductivity. Sulfur is absorbed in an electron-conduction graphite felt. The latter with its large surface forms the extension of the metal housing serving as the positive terminal and that aids in assuring that the electrochemical processes proceed fast enough. The metallic lid which is in contact with the sodium via a metal pin serves as the negative terminal. During discharge, when both terminals are connected to each other via a load, sodium migrates as an ion to the sulfur through the electrolyte tube. In the process, the sodium ions react with sulfur to form sodium polysulfide, absorbing electrons. In the course of the discharge, more and more sodium is therefore used up from the interior, and the sodium level drops. At the same time, more and more sodium polysulfide is formed, and the level in the outer space rises. The fully discharged cell contains $Na_2S_3$ as the reaction product in the outer space.

During the recharging of the cell, all processes are reversed. The reaction product $Na_2S_3$ is decomposed, the sodium ions migrate through the solid electrolyte back into the interior, and sulfur remains in the outer space. The operating temperature of the Na/S cell is above the melting points of sodium, sulfur and the sodium polysulfides, and therefore, the reactants and the reaction products are liquid. In this manner the contact necessary for the electrochemical process to proceed between the solid electrolyte and the reactants can be maintained continuously. To maintain the operating temperature, which is substantially above the ambient temperature, the cells are surrounded, as is well known, by an insulating housing.

One of the most important components of an Na/S cell is the solid electrolyte. The suitability of $\beta$-aluminum oxide ($\beta$-$Al_2O_3$) as the electrolyte is based on its high conductivity and its long life. In such an individual cell, the sealing of the sodium and the sulfur space can be accomplished in such a manner that the tubular electrolyte has at its open end a shoulder, via which a rigid connection to the metallic housing of the individual cell can be made. The rigid connection is usually made by means of a plate consisting of alloy steel and rings of aluminum can be used as the seal between the alloy steel and electrolyte. The alloy steel plate in turn can be connected firmly to the housing. This design principle has the consequence that the ceramic electrolyte must take up, due to the rigid connection to the housing, any pressure differences which can occur especially due to temperature differences or by a change in the charging state. Since ceramics are brittle by nature, such an arrangement can easily lead to a fracture of the ceramic (electrolyte) and thereby to a failure of the entire cell.

SUMMARY OF THE INVENTION

An object of the invention to avoid this disadvantage in sodium/sulfur cells and to provide a cell in which the ceramic electrolyte is subjected to low mechanical stresses.

With the foregoing and other objects in view, there is provided in accordance with the invention an individual rechargeable electric cell with liquid sodium as the negative electrochemical material and liquid sulfur absorbed in graphite as the positive electrochemical material which comprises a metallic housing, a container of a sodium ion-conducting solid electrolyte open at one end disposed in the housing with space between the inner housing surface and the outer container surface of one said electrochemical material and the container interior for the other said electrochemical material, a current collector extending into said container interior, a first flexible flange connecting the current collector to the container, and a second flexible flange connecting the housing to the container.

Other features which are considered as characteristic for the invention are set forth in the appended claims.

Although the invention is illustrated and described herein as embodied in an individual rechargeable electric cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically shows a sectional view of the individual rechargeable electric cell according to the invention with an outer metal housing, an electrolyte tube open at the top arranged coaxially in the housing, liquid sodium in the tube, a current collector extending down through the open end of the tube into the sodium, an alpha-$Al_2O_3$ ring at the open end of the tube, a first flexible flange which connects the current collector to the ring attached to the tube via an aluminum ring, a second flexible flange connected to the housing and to the alpha-$Al_2O_3$ ring via another ring, and sulfur in the space between the housing and tubular electrolyte.

DETAILED DESCRIPTION OF THE INVENTION

Figure 1:
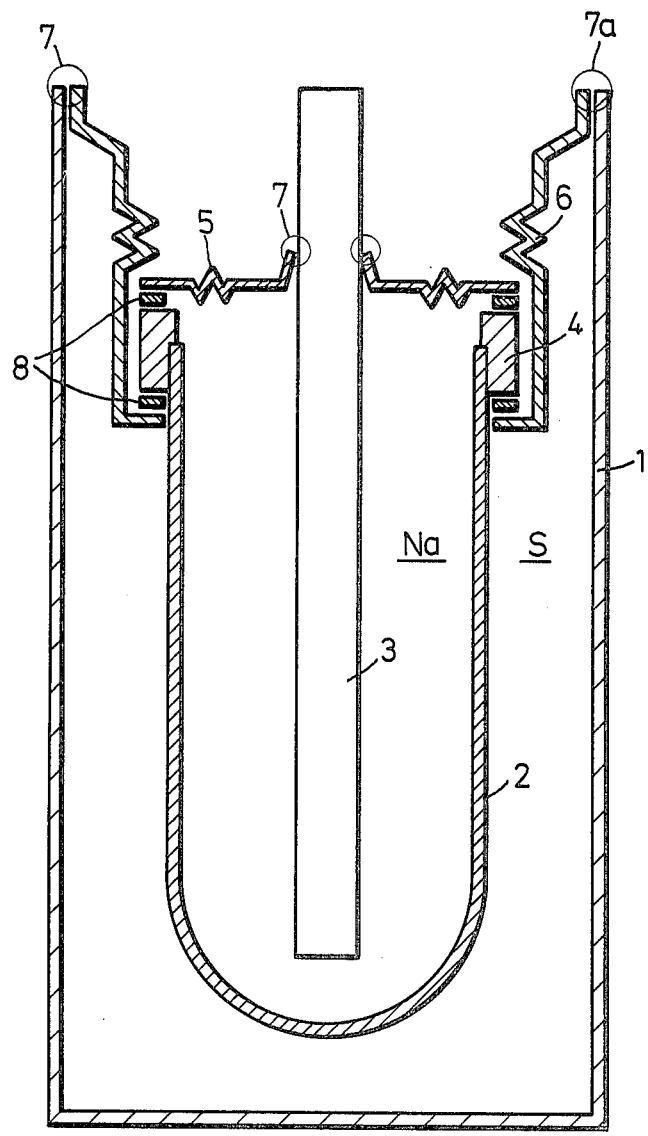

According to the invention, the individual rechargeable electric cell of the type mentioned at the outset has the current collector connected to the electrolyte via a first flexible flange, and the electrolyte connected to the housing via a second flexible flange. Thus, the function of sealing the cell is separated from the mounting of the cell.

Individual cells of this type usually have a tubular metallic housing in which an electrolyte open on one side is arranged coaxially. In principle, the sodium or the sulfur can be arranged either between the housing and the electrolyte or in the electrolyte. In the case of individual cells in which the sulfur is arranged outside the electrolyte and is absorbed in the graphite, the electrolyte can be braced against the felt. In an inverse arrangement of the sulfur and the sodium, the mounting of the electrolyte proper can be accomplished by simply placing it on a flexible base. The stress of the ceramic due to temperature which occurred in the old individual cells was essentially caused by the fact that the coefficient of thermal expansion in steel (housing) is several times as large than the coefficient of thermal expansion in the electrolyte or in the alpha-$Al_2O_3$ ring fused to the electrolyte, which, if the temperature of the battery varies by more than 100° C., introduces undesirable forces and causes stresses which could lead to cracks or breaks. In the proposed individual cell, the connection between the electrolyte and the housing, and between the electrolyte and the current collector is made via flexible flanges, which are advantageously realized as bellows or flexible sleeves. Relative movements between the electrolyte and the housing and the current collector, respectively, can be taken up in a simple manner by the sleeves or the bellows, without significant stresses occurring between said components. The electrolyte, which has a fused-on ring of alpha-$Al_2O_3$ at its open end, is connected via this ring to the bellows or the sleeves via thermo-compression seals. The bellows or sleeves are connected to the housing or the current collector via welded joints.

Further advantages and features of the invention can be seen from the following description of further details with particular reference to the accompanying drawing.

As may be seen from the schematic presentation of the individual cell according to the invention, an electrolyte 2 which has the form of a tube section open on one side is arranged coaxially in the housing 1 of the individual cell. The electrolyte 2, made from beta-$Al_2O_3$, serves as a receptacle for liquid sodium (Na) and has at its open end an alpha-$Al_2O_3$ ring 4. A current collector 3 which is connected to the electrolyte via a first flexible flange 5 is arranged axially in the electrolyte 2. The flexible flange 5 is affixed to the current collector 3 by a weld 7, and is connected to the alpha-$Al_2O_3$ ring 4 via an aluminum ring 8. The electrolyte 2 is also connected to the housing 1 via a second flexible flange 6, the latter being attached to the housing 1 by welds 7a and, to the alpha-$Al_2O_3$ ring via an aluminum sealing ring 8. The seal itself in this embodiment example is a thermo-compression seal. Here, the aluminum rings 8 are joined with the two flexible flanges 5, and 6 under pressure at a temperature of about 600° C. to the alpha-$Al_2O_3$ ring 4. This yields a tight and well-adhering connection. The flanges 5 and 6 consist of alloy steel and are designed as the bellows 6 and as the sleeve 5. These forms ensure high flexibility, so that the requirement of low mechanical stress is met. The sulfur (S) which is absorbed in the graphite, against which the electrolyte 2 can be braced, is disposed between the electrolyte 2 and the housing 1.

The cell according to the invention can also be realized as an inverted cell, i.e., the sodium may be disposed outside the electrolyte tube, and sulfur inside.

We claim:

1. Individual rechargeable electric cell with liquid sodium as the negative electrochemical material and liquid sulfur absorbed in graphite as the positive electrochemical material which comprises a metallic tubular housing, a tubular container of a sodium ion-conducting solid electrolyte open at one end disposed in the housing with space between the inner housing surface and the outer container surface for one said electrochemical material and the container interior for the other said electrochemical material, a current collector extending into said container interior, a first flexible flange connecting the current collector to the container, a second flexible flange connecting the housing to the container, an alpha-$Al_2O_3$ ring fused-on to the open end of the electrolyte, said ring connected to said two flanges via thermocompression seals, the first flange connected to the current collector by a weld, the second flange connected to the housing by a weld, said first flange containing bellows or flexible sleeves to allow lateral movement of the solid electrolyte relative to the current collector, and said second flange containing bellows or flexible sleeves to allow vertical movement of the electrolyte relative to the housing.

* * * * *